United States Patent [19]
Meijer

[11] 4,198,954
[45] Apr. 22, 1980

[54] SOLAR COLLECTOR, COMPRISING SOLAR TRACKING MEANS

[75] Inventor: Roelf J. Meijer, Eindhoven, Netherlands

[73] Assignee: U.S. Philips Corporation, New York, N.Y.

[21] Appl. No.: 849,038

[22] Filed: Nov. 7, 1977

[30] Foreign Application Priority Data

Feb. 21, 1977 [NL] Netherlands ............... 7701812

[51] Int. Cl.² .................................... F24J 3/02
[52] U.S. Cl. .................................... 126/425; 353/3; 126/438
[58] Field of Search ............... 126/270, 271; 237/1 A; 60/641; 250/203 R; 353/3

[56] References Cited
U.S. PATENT DOCUMENTS

| | | | |
|---|---|---|---|
| 2,135,997 | 11/1938 | Arthuys | 126/270 |
| 3,070,643 | 12/1962 | Toulmin, Jr. | 126/270 |
| 3,982,526 | 9/1976 | Barak | 126/270 |
| 4,027,651 | 6/1977 | Robbin, Jr. | 126/271 |

Primary Examiner—James C. Yeung
Attorney, Agent, or Firm—Thomas A. Briody; William J. Streeter; Rolf E. Schneider

[57] ABSTRACT

A solar collector comprising a focussing reflector rotatable about an axis; an adjusting mechanism for effecting rotation of the reflector about such axis; and a solar-tracking arrangement for actuating the adjusting mechanism, the solar-tracking arrangement including a pair of sun-sensor reservoirs each containing a high-pressure working medium that thermally expands when subjected to solar radiation.

12 Claims, 11 Drawing Figures

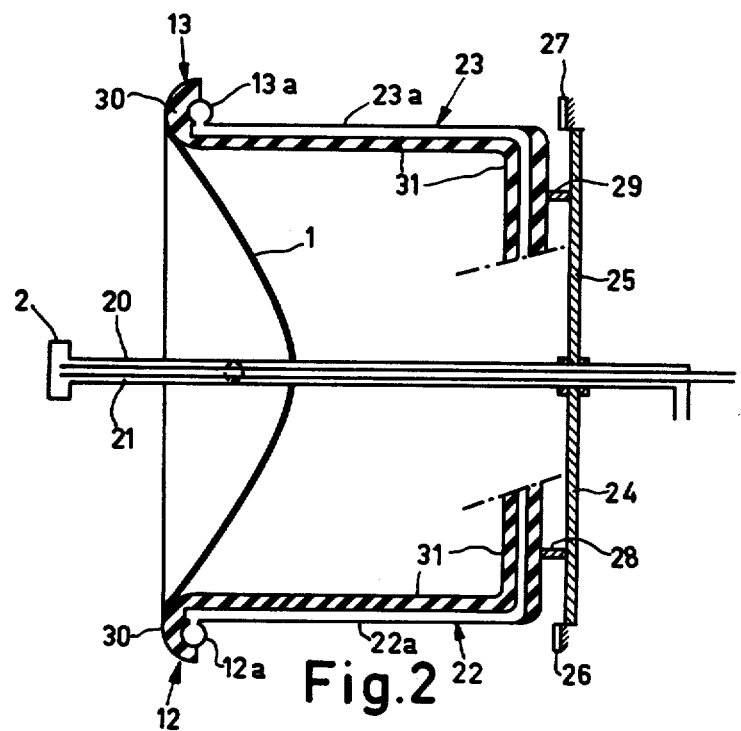
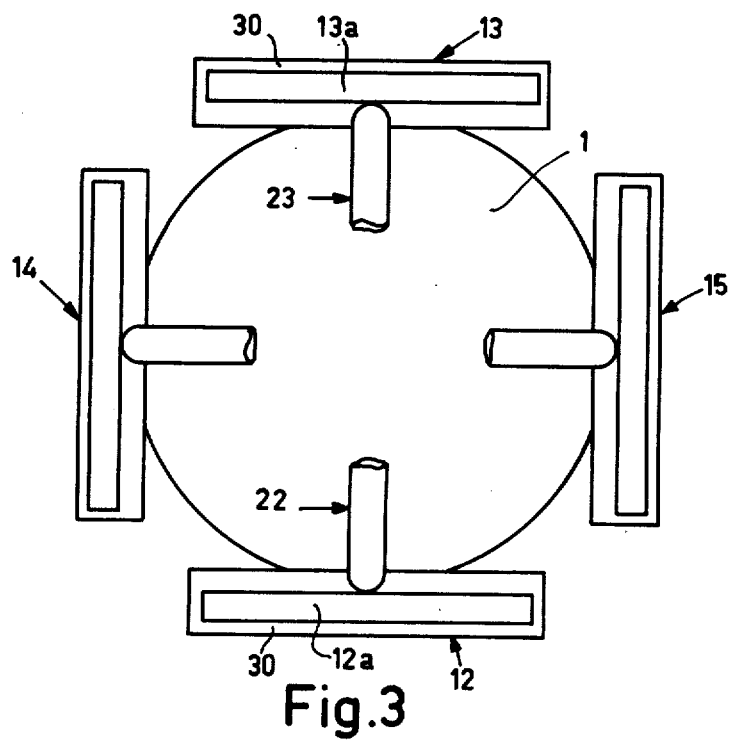

SOLAR COLLECTOR, COMPRISING SOLAR TRACKING MEANS

This invention relates to a solar collector, comprising a focussing reflector which is mounted on a frame, so as to be rotatable about at least one axis and which is coupled to at least one adjusting mechanism for rotation of the reflector about said axis, an absorber for receiving solar radiation concentrated by the reflector, and solar tracking means comprising at least one pair of sun sensors which are secured on mutually different sides of the reflector and which actuate the adjusting mechanism in an opposite sense during operation in order to maintain a reflector position which corresponds to focussing of solar radiation on the absorber.

A solar collector of the described kind is known from French Pat. No. 2,257,067.

The known solar collector comprises a parabolic reflector which is rotatable about a horizontal axis and about a vertical axis.

Two pairs of photoelectric cells are connected to the parabolic reflector as sun sensors. One pair of photoelectric cells controls, in a mutually opposite sense, an electric motor which effects rotation of the reflector about the horizontal axis. The other pair of photoelectric cells controls, in a mutually opposite sense, a second electric motor which effects rotation of the reflector about the vertical axis.

The present invention has for its object to provide a solar collector of the described kind which has an inexpensive and simple construction and whose solar tracking means constitutes a strong and rigid system such that, notably in the case of large reflectors, large forces exerted by the wind can be readily withstood.

In order to realize this object, the solar collector in accordance with the invention is characterized in that each of the sun sensors is formed by a reservoir having at least one solar radiation absorbing wall and containing a high-pressure working medium whose thermal expansion is proportional to the quantity of solar radiation incident on the relevant solar radiation absorbing reservoir wall, each reservoir being connected, via a first duct which contains a pressure transfer medium, to the adjusting mechanism and, via a second duct which is in open communication with the first duct and which also contains a pressure transfer medium, to a source of high-pressure medium at constant pressure, the second ducts including one or more valve members which are controlled by the high-pressure working mediums, so that in the case of a difference in expansion of the two high-pressure working mediums, occurring in a reflector position which deviates from the desired position, only the connection between the source at high-pressure medium of constant pressure and that first duct in which the lower pressure prevails is opened.

For example, the following liquids are suitable working mediums having a favourable cubic expansion coefficient: butyl chloride, acetone, acetonitrile, ethyl ester of acetic acid, hexane, methylethylketone, chloroform, ethyl ester of propionic acid, propyl bromide and heptane, at a pressure of, for example, 50 to 100 atmospheres absolute. The pressure transfer may be hydraulic or pneumatic.

Because the connection between the source of high-pressure medium and that first duct in which the lower pressure prevails is opened in the case of a difference in expansion of the two high-pressure working mediums, the quantity of pressure transfer medium to be displaced in this duct can escape towards the source wherefrom it can be extracted again at a later stage.

A preferred embodiment of the solar collector in accordance with the invention is characterized in that the solar radiation absorbing wall of each reservoir is oriented in a direction opposite to the direction in which the focussing reflector wall is situated, each solar radiation absorbing reservoir wall having associated with it a reflective element which is oriented in the same direction as the focussing reflector wall and which serves to selectively reflect solar radiation to the relevant solar radiation absorbing reservoir wall when the reflector position deviates from the desired position.

In a further preferred embodiment of the solar collector in accordance with the invention, the high-pressure working medium, the pressure transfer medium and the high-pressure medium in the source are formed by one and the same high-pressure liquid.

In order to prevent heat leakage from the working medium to the pressure transfer medium, and hence reduced sensor sensitivity and response rate, the high-pressure working medium and the pressure transfer medium are separated from each other by a movable partition of a heat insulating material in a preferred embodiment of the solar collector in accordance with the invention.

Another preferred embodiment of the solar collector in accordance with the invention is characterized in that the outer surface of the solar radiation absorbing reservoir wall is provided with a black layer having an absorption factor $\alpha \geq 0.9$ for solar radiation.

The incident solar radiation ($\lambda = 0.3$–$2$ microns) is thus substantially absorbed.

In order to increase the sensitivity of the reservoir sensors, each reservoir in accordance with the invention is heat insulated from the surroundings, at least outside the solar radiation absorbing wall.

In a still further preferred embodiment of a solar collector in accordance with the invention, the reservoir is accommodated in an evacuated envelope, having a transparent entrance window which is situated in front of the solar radiation absorbing wall.

A further increase of the sensitivity of the reservoirs is achieved in accordance with the invention in that the entrance window is provided with a light transmitting but infrared-reflective layer.

The heat radiation emitted by the solar radiation absorbing wall is thus reflected back to this wall.

Moreover, in accordance with the invention it is advantageous to provide the part of the envelope which is remote from the solar radiation absorbing wall with a reflective layer.

On the one hand, this contributes to more efficient use of the solar radiation which is received as a control signal, whilst on the other hand the effect of false radiation directly incident on the envelope is reduced.

In order to reduce the effect of solar radiation or ambient temperature variations on the part of the solar tracking system which is connected to the reservoirs, the first ducts and the second ducts and the source of constant high-pressure medium in accordance with the invention are heat insulated from the surroundings.

Another preferred embodiment of the solar collector in accordance with the invention is characterized in that there is provided a pressure safety device which, when a given pressure level which simultaneously occurs in both first ducts is exceeded, enables pressure transfer medium to be discharged from said first ducts.

Pressure safety is of importance if, while the solar collector is not in operation and the second ducts are closed, the pressures in both reservoirs and the two first ducts tend to become unacceptably high by gradual heating up due to a high ambient temperature level.

In still another preferred embodiment of the solar collector, in which the reflector is rotatable about at least one axis through a freely arranged absorber, the absorber in accordance with the invention is connected, via a system which transports heat by an evaporation/condensation cycle, to a heat accumulating or heat consuming device which is arranged at a level, higher than that of the absorber.

The evaporation/condensation process not only enables a large quantity of heat to be discharged from the absorber, but the condensate can also return to the absorber by gravity. The arrangement enables heat transport over large distances, without the use of aids, such as a pumping device, being required for the transport of condensate.

The transport of condensate by means of a capillary structure can be effected over only comparatively short distances (notably the lifting level is low in the case of condensate transport against gravity). The latter could give rise to problems for the arrangement, in view of lack of adequate distance between the solar collector and the heat accumulator or the heat consuming device (for example, a hot gas engine).

The invention will now be described in greater detail with reference to the accompanying drawings, in which:

FIG. 2 is a sectional view of the reflector and the absorber of FIG. 1, taken along the line II—II, and of a part of the associated solar tracking means.

FIG. 3 is a rear view of the reflector shown in FIG. 1.

Figure 1:
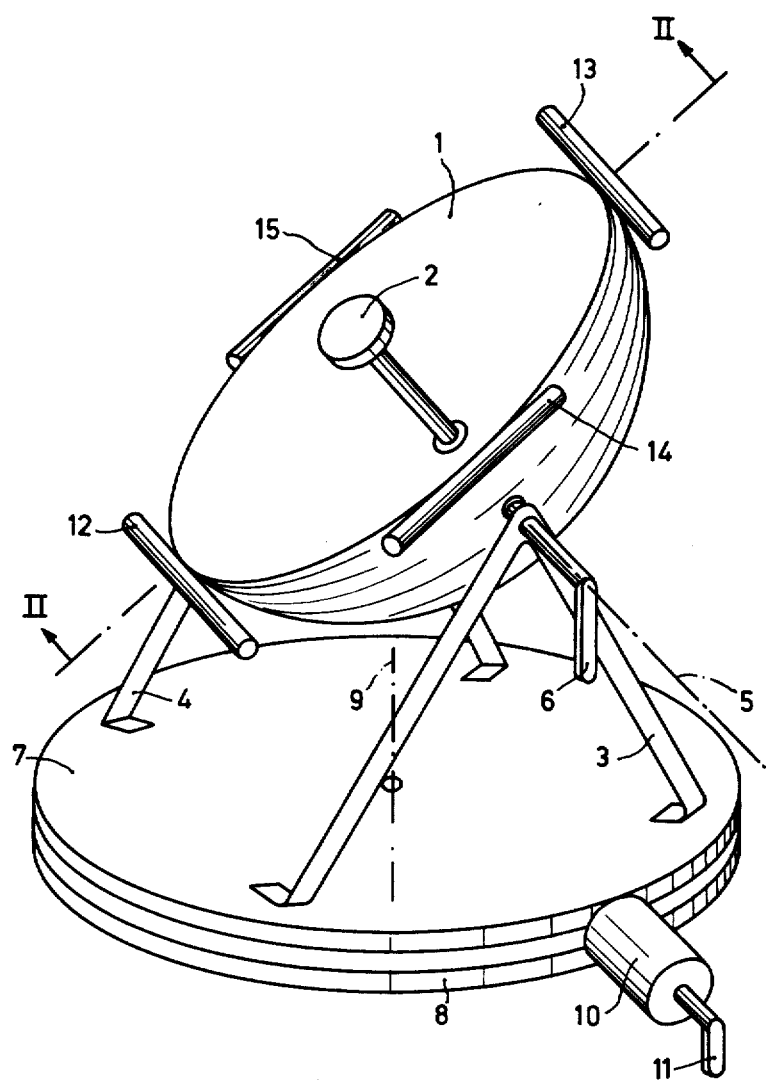
FIG. 1 is a perspective view of an embodiment of the solar collector in accordance with the invention, together with some parts of the solar tracking means.

Reference numeral 1 in FIG. 1 denotes a parabolic reflector, at the focus of which there is arranged an absorber 2 which is rigidly connected to the reflector. The reflector is mounted on two supports 3 and 4, each shaped as a V turned upside down, on which it can rotate about a horizontal axis 5 by operation of a lever 6.

The bases of the supports 3 and 4 are secured to a rotary disc 7 which is rotatably mounted on a base plate 8 and which enables rotation of the reflector about a vertical axis 9. The rotary disc 7 is coupled on its lower side, for example, via a gearwheel, to a known transmission 10 which in its turn is coupled to a lever 11, so that a given rotary movement of the lever 11 is accompanied by a given angular rotation of the rotary disc 7.

Two tubular reservoirs 12 and 13 which act as sun sensors are secured parallel to the horizontal axis 5, on either side of the reflector 1.

Perpendicularly thereto two tubular reservoirs 14 and 15 which also serve as sun sensors are secured on either side of the reflector 1.

The reservoirs 12 and 13 are coupled to the lever 6 in a manner to be described, the reservoirs 14 and 15 being coupled to the lever 11 in the same manner.

FIG. 2 shows how the absorber 2 is connected to a tube 20, in which a tube 21 is coaxially arranged. The tubes 20 and 21 serve for the supply of heat transport medium to the absorber 2 and for the discharge of the medium heated in the absorber 2. Each of the reservoirs 12 and 13 is in open communication with a duct 22, 23, respectively, which will be described with reference to FIG. 4.

Via rods 24 and 25, mirrors 26 and 27 are mounted on the tube 20, said mirrors facing the reservoirs 12 and 13, respectively. For reinforcement, the rods 24 and 25 are anchored to the rigid ducts 22 and 23, via connection pieces 28 and 29.

Except for a solar radiation absorbing wall 12a and 13a, respectively, the reservoirs 12 and 13 are heat insulated from the surroundings by means of insulating material 30. The ducts 22 and 23 are enclosed by heat insulating material 31, except for a solar radiation absorbing wall 22a, 23a, respectively.

Figure 4:
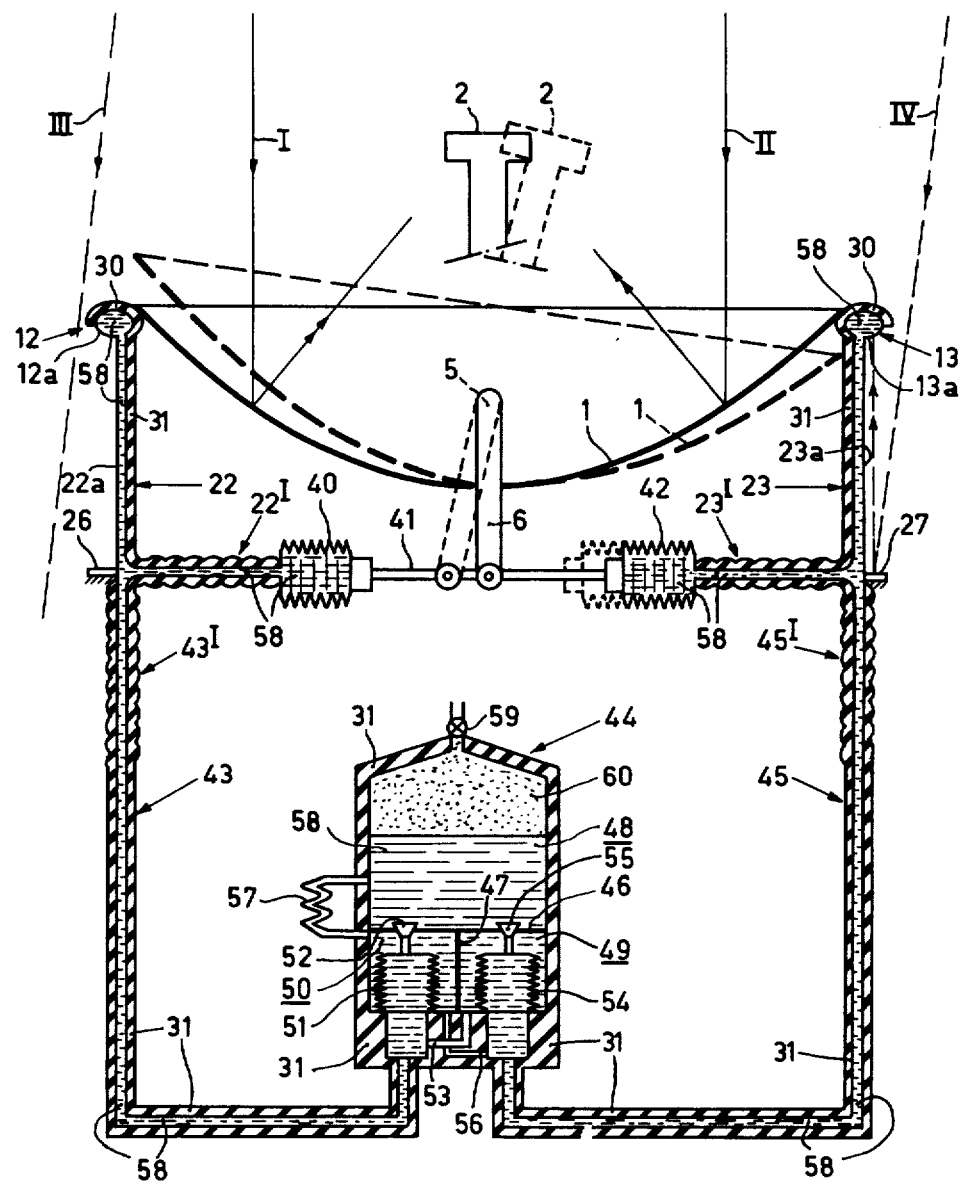
FIG. 4 is a sectional view on an enlarged scale of the reflector of FIG. 1 and of the solar tracking means for rotation of the reflector about a horizontal axis.

FIG. 4 shows how the duct 22, including a flexible portion 22', is pivotally connected to the lever 6 (FIG. 1) via a bellows 40 and a rod 41. The duct 23, including a flexible portion 23', is also pivotally connected to the lever 6 via a bellows 42 and the rod 41.

One end of a duct 43, including a flexible portion 43', is connected to the duct 22, whilst its other end is connected to a high-pressure vessel 44; one end of a duct 45, including a flexible portion 45', is connected to the duct 23, its other end also being connected to the high-pressure vessel 44.

The ducts 43 and 45 and the high-pressure vessel 44 are also enclosed by insulating material 31.

The high-pressure vessel 44 is sub-divided into three compartments 48, 49 and 50 by partitions 46 and 47.

The duct 43 opens into a bellows 51 which supports a valve body 52 which can open the connection between the compartments 48 and 50. The duct 43 is in open communication with the compartment 49 via a duct 53.

The duct 45 opens into a bellows 54 which supports a valve body 55 which can open the connection between the compartments 48 and 49. The duct 45 is in open communication with the compartment 50 via a duct 56.

One end of a capillary duct 57, having a high flow resistance for excess pressure protection purposes, is connected to the compartment 48, its other end being connected to the compartment 50.

During operation, the reservoirs 12 and 13 and the system connected thereto are filled with a liquid 58 having a high cubic expansion coefficient $\gamma$, for example, butyl chloride, at a high pressure of, for example, 100 atmospheres absolute. The high pressure is obtained by forcing a pressurized gas 60, for example, air, into the vessel 44 via a valve 59. The vessel 44 is amply dimensioned so that the fluctuations of the quantity of liquid 58 present in the compartment 48 which occur in practice have no noticeable effect on the pressure in this compartment.

The operation of the solar tracking system is as follows.

For the sake of simplicity it is assumed that the reflector 1 is in a horizontal position, and that the solar radiation is vertically incident.

The perpendicularly incident sun rays I and II, denoted by non-interrupted lines, are concentrated on the absorber 2, whilst no solar radiation is directly incident on the mirrors 26 and 27 because they are situated in the shade of the reservoirs 12 and 13, respectively.

The solar tracking system is then in a rest position. When the radiation is incident at an angle due to the movement of the sun (rays III and IV, denoted by broken lines), only the mirror 27 directly receives solar radiation (ray IV) which is reflected to the reservoir 13 and the non-covered portion 23a of the duct 23. The temperature of the liquid 58 in the reservoir 13 and said duct portion 23a thus increases and this liquid expands, which causes the bellows 42 to move to the left and the lever 6 to be displaced to the left. Thus, the reflector 1 is rotated about the horizontal axis 5 and occupies a new position, denoted by broken lines, in which the solar radiation is again focussed onto the also rotated absorber 2.

At the same time, the pressure increase in the duct 45 acts, via the duct 56 and the compartment 50, on the upper face of the bellows 51, so that the valve body 52 remains in the closed position. Moreover, the pressure increase in the duct 45 ensures, via the bellows 54, that the valve body 55 moves upwards and opens the connection between the compartments 49 and 48. Thus, the quantity of liquid displaced in the bellows 40, by the movement of the bellows to the left, is given the opportunity of flowing, via the duct 43, the duct 53 and the compartment 49, to the compartment 48.

When the reflector 1 reaches its new position, in which pressure equilibrium prevails in the bellows 40 and 42, the mirror 27 no longer receives directly incident solar radiation. The liquid in the reservoir 13 contracts and the bellows 54 moves downward, so that the valve body 55 occupies the closed position again.

When the sun travels in the opposite direction, the mirror 26 and hence the reservoir 12 and the wall 22a are exposed to solar radiation. The bellows 40, the lever 6 and the bellows 42 then move to the right, with the result that the reflector 1 rotates to the left. The valve body 55 then remains in the closed position, whilst the valve body 52 opens the connection between the compartments 50 and 48.

By means of counterweights, (not shown) it can be ensured that the centre of gravity is situated on the axis of rotation 5, so that a stable equilibrium prevails in any reflector position.

In circumstances in which both valve bodies 52 and 55 are in the closed position and the pressures in the system (and hence in the compartments 50 and 49) tend to become inadmissibly high, for example, in the case of a prolonged, high ambient temperature level, the liquid in the system overcomes the high flow resistance of the capillary duct 57 and flows to the compartment 48. The system is thus pressure-relieved.

As has already been stated, the reservoirs 14 and 15 (FIG. 1) are coupled, via an identical system, to the lever 11 for rotation of the reflector 1 about the vertical axis 9.

The operation of this second system is identical to that described with reference to FIG. 4, so that the description need not be repeated.

Figure 5:
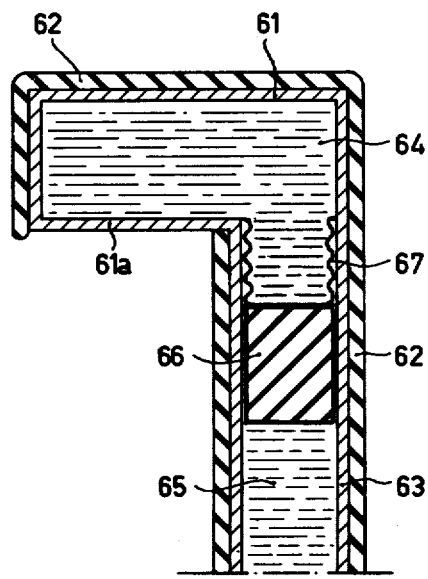
FIG. 5 is a sectional view of an embodiment of a reservoir-sun sensor.

The sun sensor shown in FIG. 5 comprises a reservoir 61, having a solar radiation absorbing wall 61a and heat insulation 62. A duct 63 communicates with the reservoir 61. Pressurized working medium 64 in the reservoir 61 is separated from pressure transfer liquid 65 in the duct 63 by way of a movable partition 66 of a heat insulating material, for example, a synthetic material. The movable partition 66 is secured to the wall of the duct 63 via a bellows 67. Heat derived from solar radiation incident on the wall 61a and applied to the working medium 64 is thus no longer lost by conduction to the pressure transfer liquid 65.

Figure 6B:
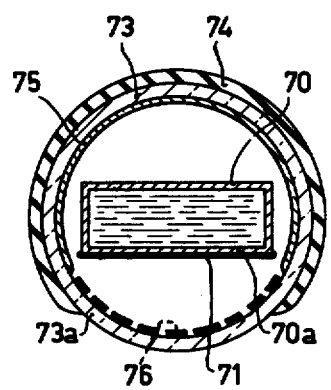
FIG. 6a is a longitudinal sectional view and FIG. 6b is a cross-sectional view of a further embodiment of a reservoir-sun sensor.
Figure 6A:
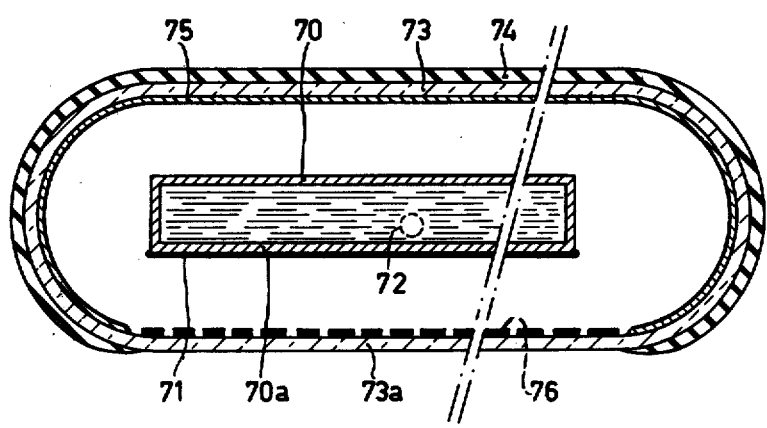

The sun sensor shown in FIGS. 6a and 6b comprises a reservoir 70, having a solar radiation absorbing wall 70a which is covered with a black layer 71 of, for example, nickel oxide or copper oxide which has a high absorption factor for solar radiation. A black layer of this kind may also have a low emission factor for heat radiation. The reservoir 70 includes an aperture 72 whereto the duct for pressure transfer medium (not shown) is connected. The reservoir 70 is accommodated in an evacuated glass envelope 73 which is partly covered by heat insulating material 74 and which includes an entrance window 73a for solar radiation on its lower side.

The inner side of the glass envelope 73 is provided over more than half its circumference with a reflective layer 75, of for example, aluminium.

On the lower part of the envelope 73, a layer 76 is provided on the inner side, said layer transmitting sun light ($\lambda = 0.3$–2 microns) but reflecting heat radiation ($\lambda = 3$–30 microns) and being made, for example, of tin oxide or tin-doped indium oxide.

The reflective layer 75 reflects radiation to the reservoir 70, whilst the layer 76 reflects the heat radiation emitted by the layer 71 back to the wall 70a.

Figure 7:
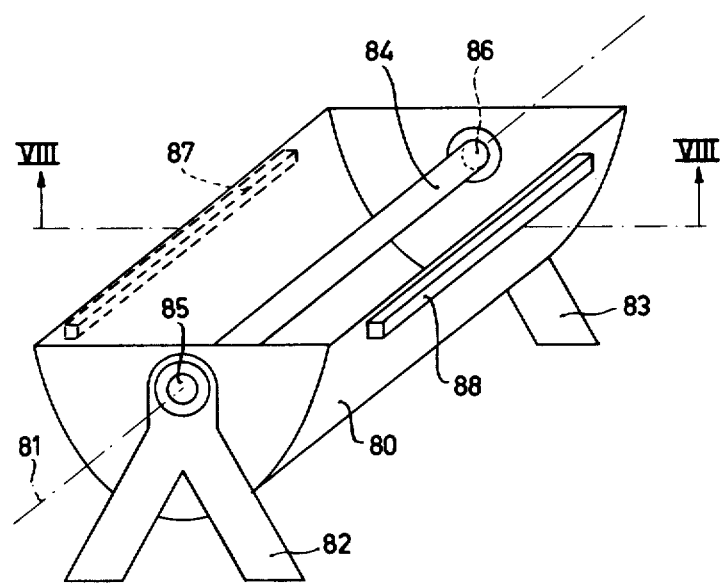
FIG. 7 is a perspective view of a further embodiment of the solar collector in accordance with the invention, including two reservoir-sun sensors.

The solar collector shown in FIG. 7 comprises an elongate reflector 80, having a parabolic cross-section (parabolic trough), which is mounted on supports 82 and 83 so as to be rotatable about a horizontal axis 81 (coincident with the focal line of the trough).

An elongate absorber 84, including an inlet 85 and an outlet 86, for a heat transport medium, is rigidly arranged in the focal line.

Figure 8:
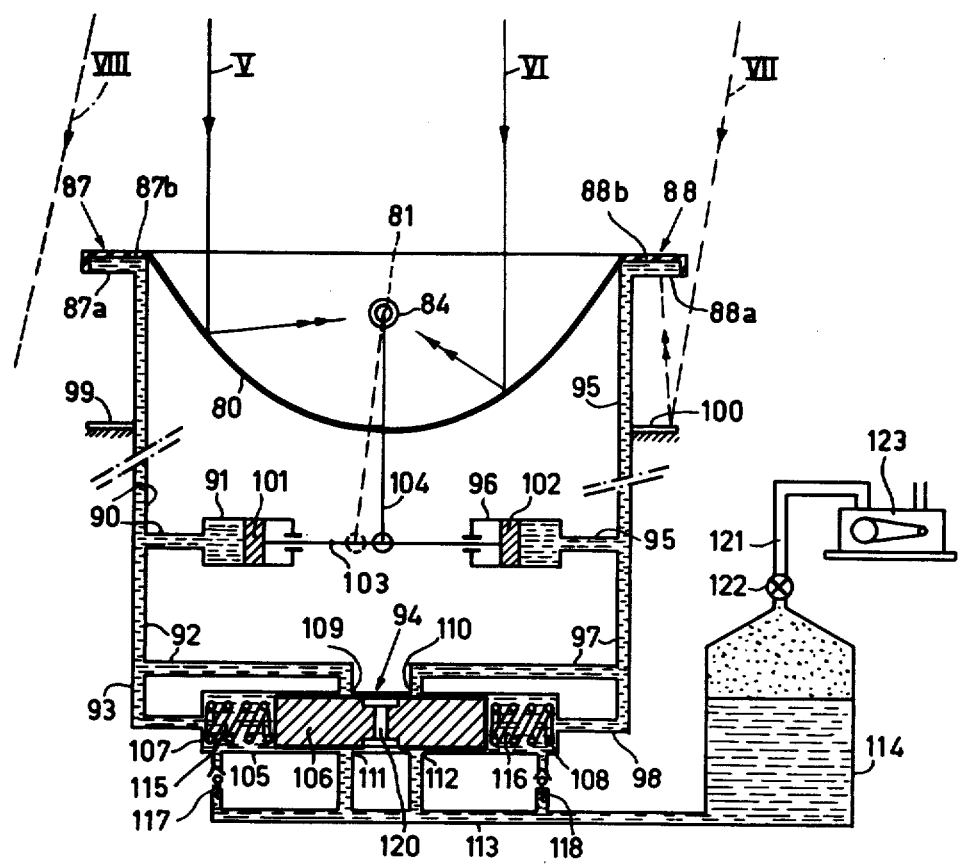
FIG. 8 is a sectional view on an enlarged scale of FIG. 7 (taken along the line VIII—VIII), and of a further embodiment of the associated solar tracking means.

Elongate reservoir sensors 87 and 88, forming part of the solar tracking system shown in FIG. 8, are mounted parallel to the absorber 84 on both sides of the parabolic trough 80.

FIG. 8 shows how the reservoir 87 is connected, via a partly flexible duct 90, to a cylindrical housing 91, and, via flexible ducts 92 and 93, to a control member 94.

The reservoir 88 is connected, via a partly flexible duct 95, to a cylindrical housing 96 and, via flexible ducts 97 and 98, to the control member 94.

The reservoir 87 has a solar radiation absorbing wall 87a which cooperates with a mirror 99, the reservoir 88 having a solar radiation absorbing wall 88a which cooperates with a mirror 100. The reservoirs are otherwise heat insulated (87b and 88b, respectively). A piston 101 is reciprocative in cylindrical housing 91, and a piston 102 is reciprocative in cylindrical housing 96. The two pistons 101 and 102 are pivotally connected, by way of a rod 103, to a lever 104, the upper end of which is rigidly connected to the reflector 80.

The control member 94 comprises a cylindrical housing 105 in which a piston-like body 106 is reciprocative, on both sides of said body there being provided weak springs 107 and 108 which normally keep the body 106 in its central position.

Opposite the ports 109 and 110 in the wall of the housing 105, the ducts 92 and 97 being connected to said ports, there are situated ports 111 and 112 which are connected, via a duct 113, to a high-pressure vessel 114 at constant pressure. The chamber 115 inside the housing 105 is connected to the duct 113 via a spring-loaded non-return valve 117, and the chamber 116 is connected to the duct 113 via a spring-loaded non-return valve 118. Both non-return valves open in the direction towards the duct 113. A duct 120 is provided in the piston-like body 106.

The high-pressure vessel 114 is connected, via a duct 121 which includes a valve 122, to a compressor 123 by means of which the gas pressure in the vessel 114 can be adjusted.

During operation, the solar tracking system is again filled with a liquid having a high cubic expansion coefficient, γ, for example, acetone, at a high pressure of, for example, 75 atmospheres absolute.

Figure 8A:
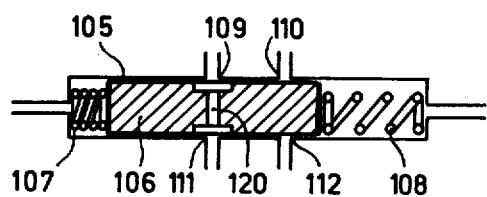
FIG. 8a shows the control member, shown in FIG. 8, in a different operating position.

The operation of this solar tracking system is as follows. In the case of incidence of solar radiation at right angles (non-interrupted lines V and VI) on the horizontally arranged reflector 80, the radiation is focussed on the absorber 84 and no solar radiation is directly incident on the mirrors 99 and 100 which are situated in the shade of the reservoirs 87 and 88, respectively. When the sun travels from left to right, solar radiation (ray VII, broken line) is directly incident on the mirror 100, whilst the mirror 99 remains in the shade of the reservoir 87 (ray VIII, broken line). Because the liquid in the reservoir 88 is heated by the radiation originating from the mirror 100, and hence expands, the piston 102 and the piston-like body 106 are displaced to the left. The lever 104 then moves to the left, with the result, that the reflector 80 is rotated in the direction of the ray VII, whilst the piston-like body 106 occupies the position shown in FIG. 8a.

Liquid displaced in the cylinder 91 and the chamber 115 flows, via the duct 92, the port 109, the duct 120, the port 111 and the duct 113, to the high-pressure vessel 114, whilst the port 110 and hence the duct 97 remain closed. As soon as the reflector 80 has occupied its new focussing position, pressure equilibrium then prevailing in the cylinders 91 and 96, the mirror 100 is no longer exposed to directly incident solar radiation. The liquid in the reservoir 88 then cools down and the piston-like body 106 is gradually displaced to the right, so that the port 109 is gradually closed again, liquid meanwhile flowing from the vessel 114, via the duct 113, the port 111, the duct 120, the port 109 and the duct 92, to the chamber 115.

The weak springs 107 and 108 provide the correct central position of the body 106 (FIG. 8).

When the sun travels from right to left, the reservoir 87 is exposed to solar radiation via the mirror 99. The piston 101, the lever 104, the piston 102 and the body 106 are then displaced to the right. The port 109 then remains closed, whilst the port 110 comes into open communication, via the duct 120, with the port 112, so that liquid displaced in the cylinder 96 and the chamber 116 can flow, via the duct 97, the duct 120 and the duct 113, to the storage vessel 114.

Counterweights can again be used to ensure that a stable equilibrium prevails in any position of the reflector.

If the pressure level in the reservoirs 87 and 88 and the ducts 90, 92, 93, 95, 97 and 98 simultaneously becomes inadmissibly high in the position of the body 106 shown in FIG. 8, the spring-loaded non-return valves 117 and 118 open and liquid can flow to the vessel 114, so that the system is pressure-relieved.

Figure 9:
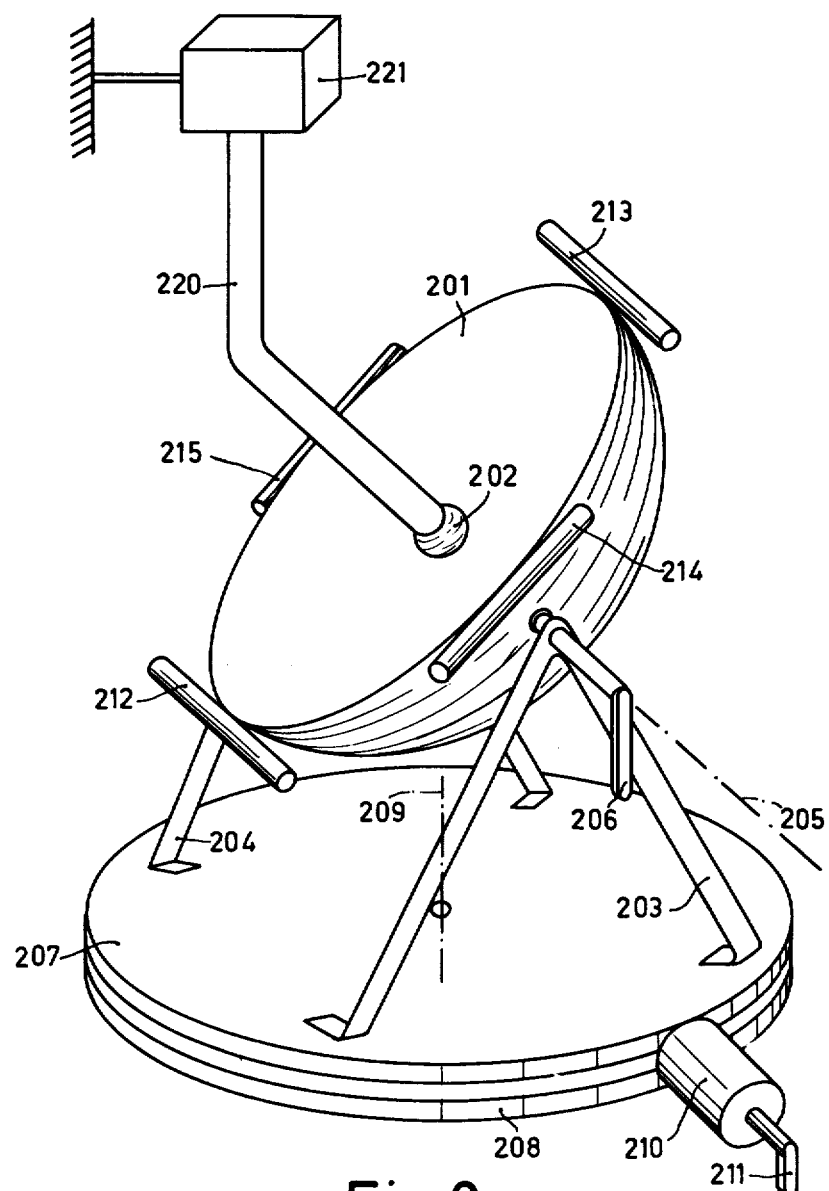
FIG. 9 is a perspective view of a further embodiment of the solar collector in accordance with the invention, including a fixedly arranged absorber.

The solar collector shown in FIG. 9 is roughly the same as that shown in FIG. 1. For corresponding parts, the same reference numerals are used, increased by the number 200.

The reflector 201 is rotatable about a horizontal axis 205 and a vertical axis 209 which both extend through the focus of the reflector, in which the absorber 202 is arranged to be stationary and loose from the reflector. Via an evaporation/condensation system 220 (a tube containing an evaporatable liquid such as water) the absorber is thermally connected to a heat consuming device (for example, a hot gas engine) or a heat accumulator 221 which is arranged at a level which is higher than that of the absorber 202.

The evaporation/condensation process results in a high heat transport capacity. Because the heat consumer 221 is situated at a level which is higher than that of the absorber 202, the heat consumer 221 may be arranged at a comparatively large distance from the absorber, without aids with their inherent limitations being required. This is because the vapour formed at the area of the absorber 202 automatically flows in the direction of the heat consumer 221 where the temperature and the pressure in the system 220 are lower, whilst after having given off its evaporation heat to the heat consumer 221, the condensate flows back to the absorber 202 by gravity. Problems as regards lack of space for arrangement of the equipment are thus simply eliminated.

What is claimed is:

1. A solar collector, which comprises a frame; a focussing reflector mounted on the frame so as to be rotatable about at least one axis; an adjusting mechanism coupled to said reflector for rotation of the reflector about said axis; an absorber for receiving solar radiation concentrated by the reflector; and solar-tracking means comprising a pair of sun sensors disposed on opposite sides of the reflector for actuating the adjusting mechanism during operation in order to maintain a reflector position corresponding to focussing of solar radiation on the absorber, each sun sensor being formed as a reservoir having a solar radiation-absorbing wall and containing a high-pressure working medium whose thermal expansion is proportional to the quantity of solar radiation incident on the solar radiation-absorbing reservoir wall, first ducts containing a pressure transfer medium and connecting the respective reservoirs to the adjusting mechanism, and second ducts respectively in open communication with the first ducts and also containing a pressure transfer medium and connecting the respective reservoirs to a source of high-pressure medium under constant pressure, the second ducts each including a member respectively controlled by the two high-pressure working mediums, whereby, upon a difference in expansion of the two high-pressure working mediums occurring in a reflector position other than its desired position, only the member included in the second duct between the source of high-pressure medium at constant pressure and that first duct having the lower pressure is operated to open said second duct.

2. A solar collector according to claim 1, in which the solar-tracking means includes a reflective element associated with each solar radiation-absorbing reservoir wall for reflecting solar radiation to the respective solar radiation-absorbing reservoir wall when the reflector position deviates from its desired position.

3. A solar collector according to claim 2, in which the high-pressure working medium, the pressure transfer medium, and the high-pressure medium in the source comprise the same liquid.

4. A solar collector according to claim 2, which includes a movable partition of a heat-insulating material separating the high-pressure working medium and the pressure transfer medium.

5. A solar collector according to claim 1, in which the outer surface of each solar radiation-absorbing reservoir wall is provided with a black layer having an absorption factor $\alpha \geq 0.9$ for solar radiation.

6. A solar collector according to claim 1, in which each reservoir is heat-insulated from the surroundings except for its solar radiation-absorbing wall.

7. A solar collector according to claim 1, in which each reservoir is positioned in an evacuated envelope having a transparent window situated in front of the solar radiation-absorbing reservoir wall.

8. A solar collector according to claim 7, in which the transparent window is provided on its inner surface with a light-transmitting but infrared-reflective layer.

9. A solar collector according to claim 8, in which the inner surface of the envelope remote from the solar radiation-absorbing reservoir wall is provided with a reflective layer.

10. A solar collector according to claim 1, in which the first ducts except for respective solar radiation-absorbing wall portions, the second ducts, and the source of high-pressure medium under constant pressure are heat-insulated from the surroundings.

11. A solar collector according to claim 1, which includes a pressure safety device that, when the pressure in both first ducts simultaneously exceeds a given level, enables pressure transfer medium to be discharged from said first ducts.

12. A solar collector according to claim 1, in which the absorber is fixedly arranged on said axis, and which includes a system for transporting heat from the absorber by the way of an evaporation/condensation cycle to a heat-accumulating device or a heat-consuming device arranged at a level higher than that of the absorber.

* * * * *